March 31, 1964    J. E. HART ET AL    3,126,903
CASCADE CONTROL SYSTEM
Filed Feb. 20, 1959    7 Sheets-Sheet 6
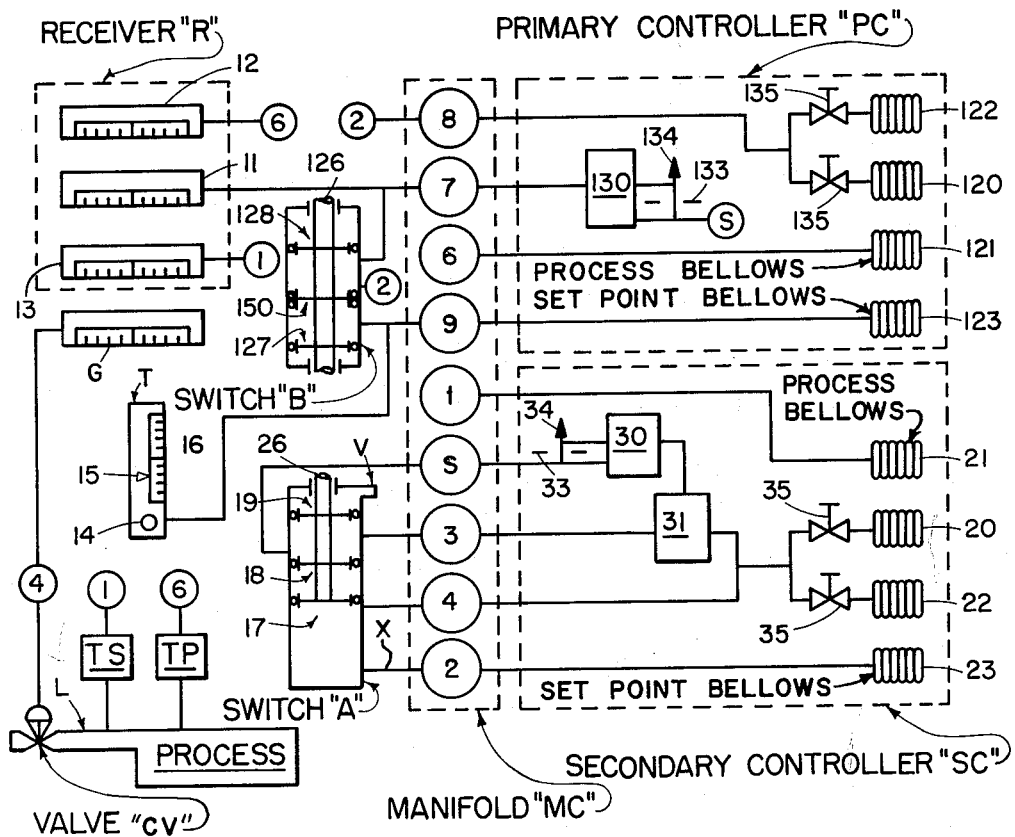
FIG. IF – MANUAL /CASCADE
INVENTOR.
John E. Hart
Howard R. Jaquith
William J. Berk
BY P. J. Young Jr.

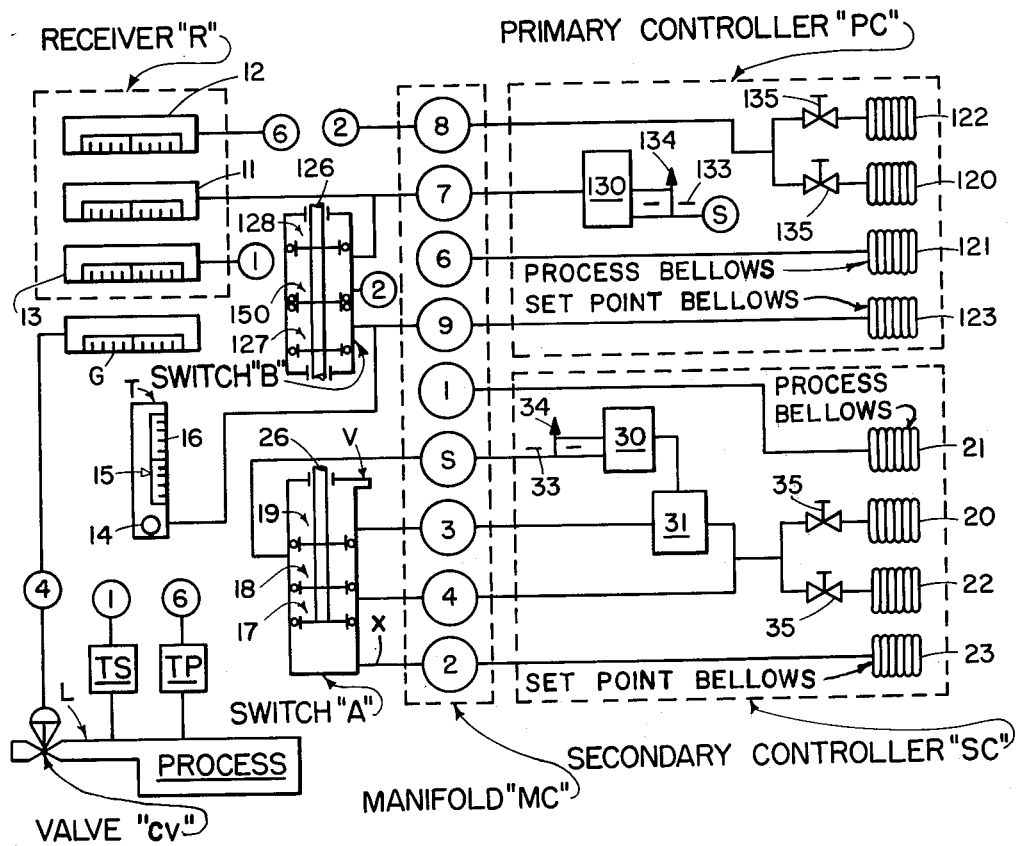
FIG. 1A – AUTO/CASCADE
INVENTORS
John E. Hart
Howard R. Jaquith
William J. Berk

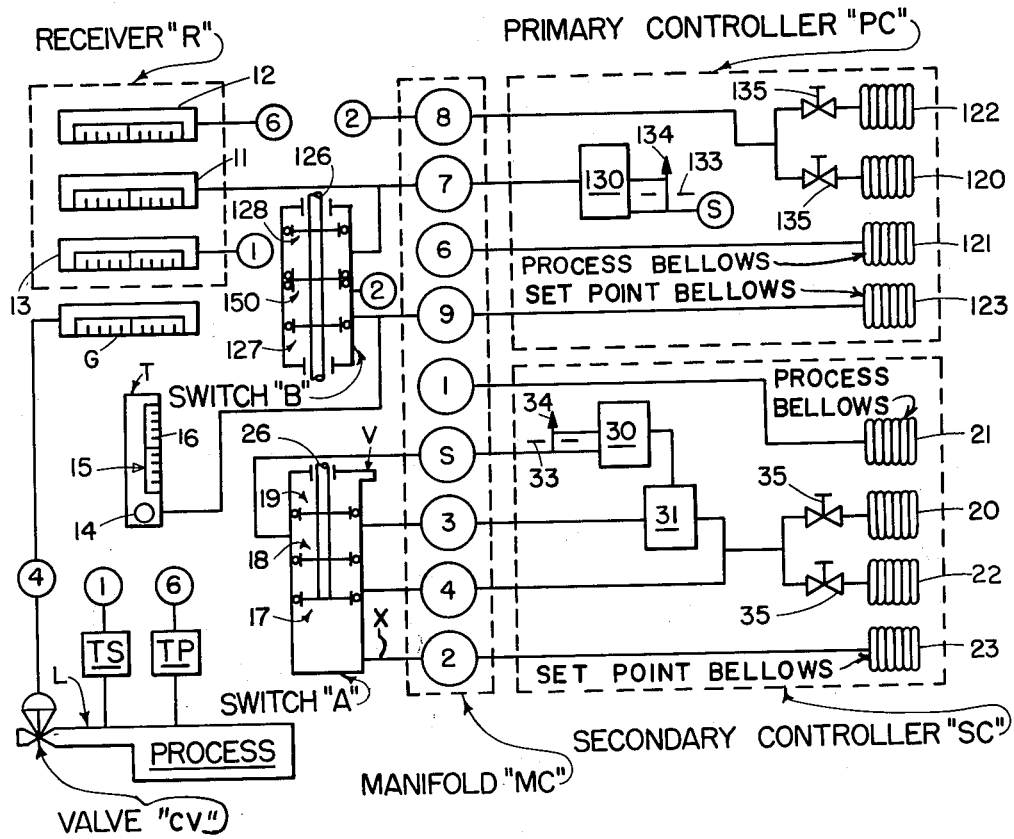
FIG. 1B — SEAL / SET
INVENTOR.
John E. Hart
Howard R. Jaquith
William J. Berk

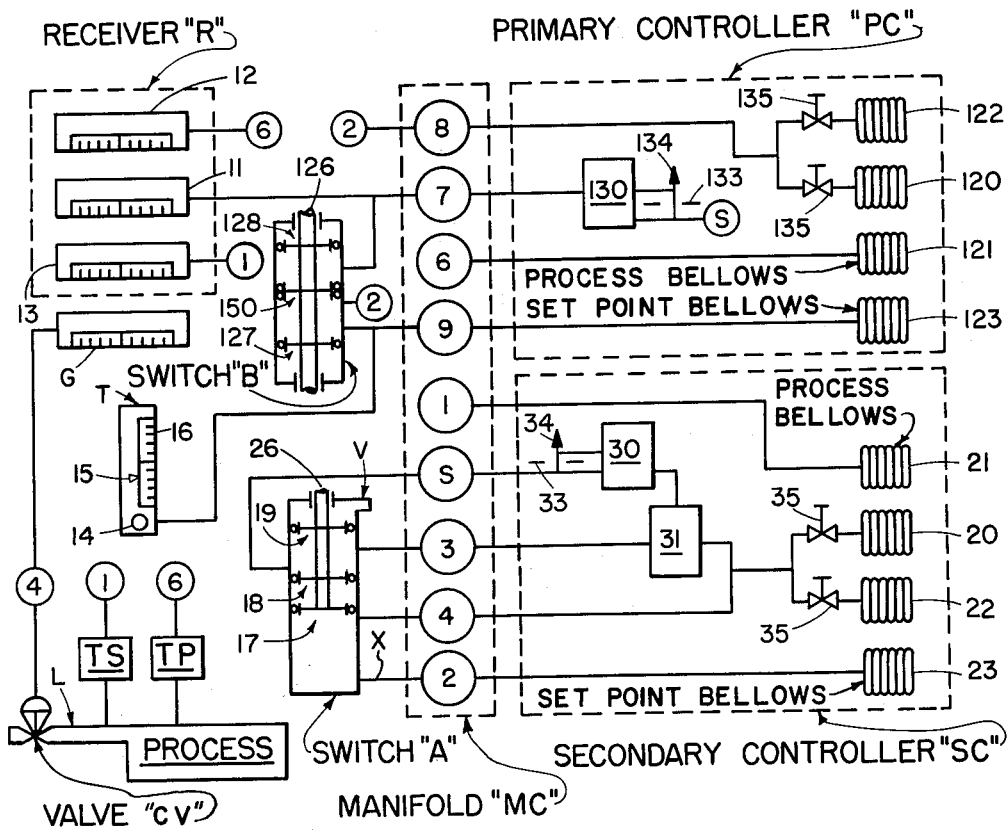
FIG. 1C — MANUAL/SET

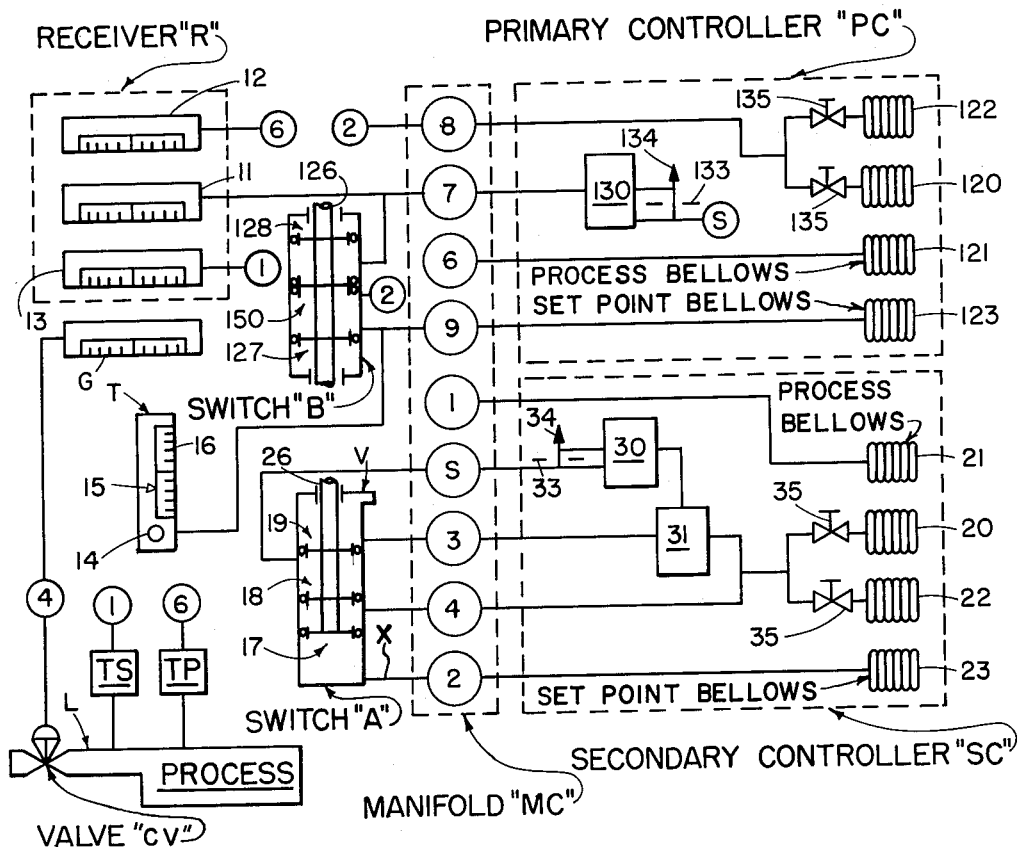
FIG. 1D — AUTO/SET

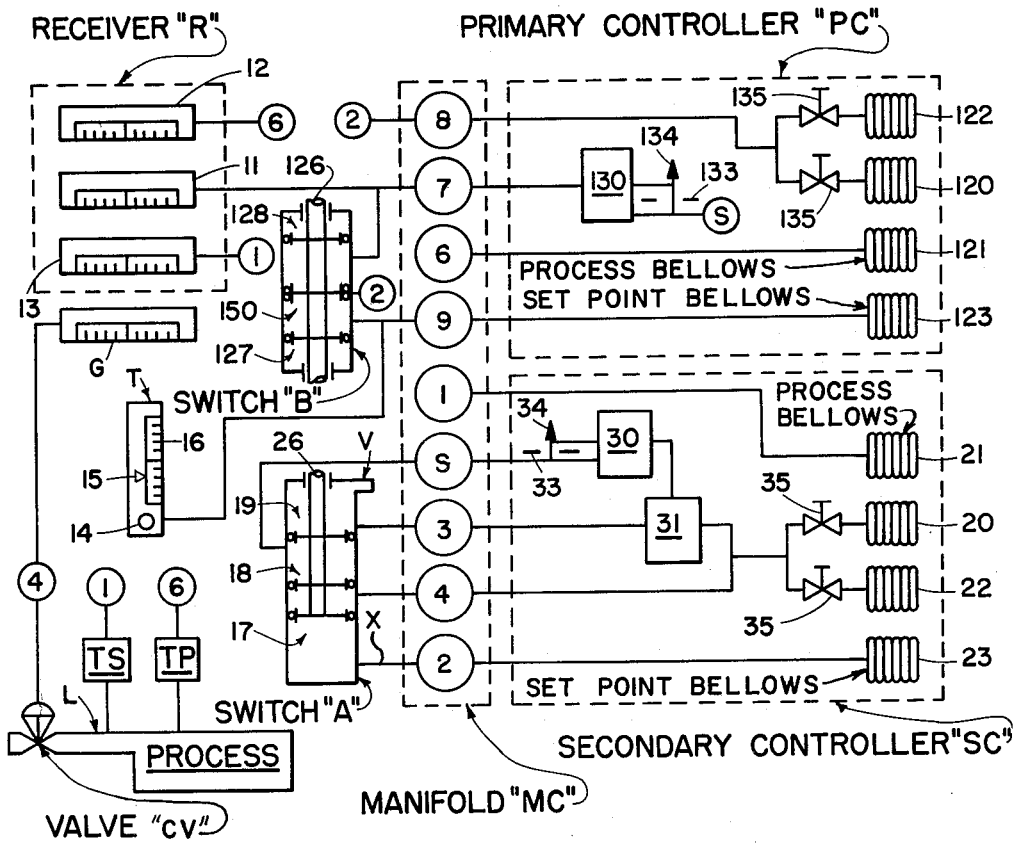
FIG. IE — AUTO / BALANCE

March 31, 1964   J. E. HART ET AL   3,126,903
CASCADE CONTROL SYSTEM
Filed Feb. 20, 1959   7 Sheets-Sheet 7

INVENTOR.
John E. Hart
Howard R. Jaquith
William J. Berk
BY P. J. Young, Jr.

United States Patent Office 3,126,903
Patented Mar. 31, 1964

3,126,903
CASCADE CONTROL SYSTEM
John E. Hart, Newton, Mass., and Howard R. Jaquith and William J. Berk, Rochester, N.Y., assignors to Taylor Instrument Companies, Rochester, N.Y., a corporation of New York
Filed Feb. 20, 1959, Ser. No. 794,611
16 Claims. (Cl. 137—84)

This invention relates to multi-controller control systems and has for one object to provide an exhibiting and controlling system wherein all the essential elements of the system (except, in some cases, one or another, several or all of several controllers proper, a process control valve or other final control element and process-located measuring means adapted to transmit process information to the said controllers and to the exhibiting elements of the control system) are located such as to be usable by a human operator without the latter having to change his location in order to supervise operation of said essential elements.

A further object of the invention is to provide a two-controller control system wherein each controller requires at times a source of manually-adjustable control-point establishing signal, yet one such source suffices to serve both controllers.

Another object of the invention is to provide a two-controller system as described supra wherein not only does one source of manually-adjustable, control-point setting signal serve two controllers, but also serves at times to furnish a final control element with a control or actuating signal manually controllable by a human operator.

Yet another object of the invention is to provide a two-controller miniature exhibiting control instrument wherein the essential elements thereof are located in one housing or common support structure, which housing or common support structure is fully equivalent in terms of space requirements with prior art exhibiting control instruments each involving only a single controller in its operations.

Still another object of this invention is to provide a two-controller system as described supra wherein it is possible to operate a final control element by either controller alone, or with the two controllers cascaded, i.e., where the controlling output of one controller provides a control or set point signal to the other controller, and the control output of said other controller is used to operate the said final control element.

The general object of the invention is to provide a cascade control system (as that concept is explained hereinafter) of improved performance, greater convenience of use and better economy of parts, as compared to its prior art counterparts.

In the prior copending application for U.S. Letters Patent of H. R. Jaquith et al., SN 749,987, filed July 21, 1958, now U.S. Patent No. 3,025,868, entitled "Control System" and assigned to the assignee of the present application, is disclosed and claimed a novel recorder and controller circuit wherein a single controller (i.e., controller C of FIGURE 1 of the aforesaid prior copending application) controls a process according to the dictates of a single process variable by regulating the effect of some final control element on the process, such effect being reflected in the magnitude, rate of change, etc., of said single process variable.

In some types of processes, however, it is necessary to take into account more than one process variable in order to regulate the process satisfactorily, as, for example, in processes controlled by so-called cascade control systems. Such systems may utilize as many controllers as there are process variables to be accounted for. We forbear any elaboration of the subject of the whys and wherefores of cascade control in favor of reference to the papers entitled "Cascade Control Systems" by J. G. Ziegler, Symposium on Instrumentation for the Process Industries, Texas A&M, 1954 Bulletin, and "Cascade Control Systems" by N. W. Gollin, pages 94–98 of Control Engineering, July 1956.

The advantages and utility of our invention will be obvious to those skilled in the art familiar with the matter set out in the cited papers, upon perusal of the following disclosure of our invention.

FIGURES 1A, 1B, 1C, 1D, 1E and 1F show the several switching configurations occurring during use of our novel cascade control circuit;

Figure 3:
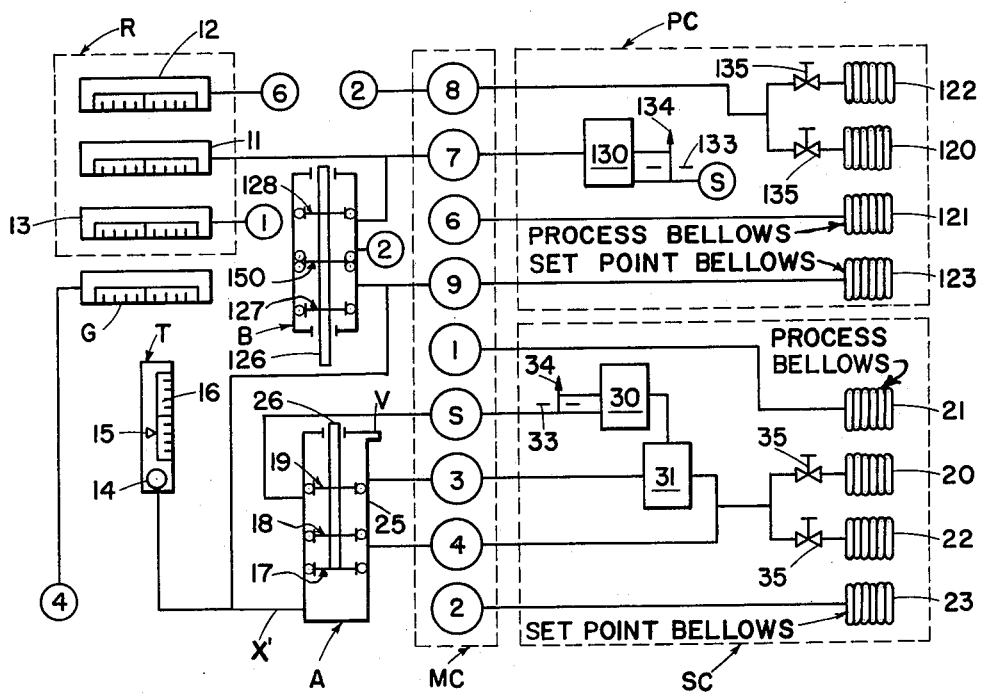
FIGURE 3 shows a modified form of the basic circuit illustrated in FIGURES 1A through 1F, inclusive.

In FIGURES 1A through 1F, appropriately-labeled, dashed-line boxes and their contents represent major functional elements of an instrument according to our invention. For example, box SC and the contents thereof represent a so-called slave or secondary controller, box MC a manifold, and box R a receiver including a number of gages for exhibiting (i.e., recording and/or indicating) various magnitudes obtaining in the system. The reference characters T, A, G and B identify respectively a set point transmitter, an auto-manual switch, a valve gage, and a cascade switch.

It will be noted that the mentioned elements individually are very similar to the corresponding entities shown in FIGURE 1 of the aforesaid prior copending application of Jaquith et al. In fact, switches A and B, set point transmitter T and gage G may be identical to the similarly-labeled entities in FIGURE 1 of the earlier application. In the present application, however, receiver R includes an additional gage 11, controller PC does not have the by-pass switch 39 of its counterpart controller C, manifold MC has more ports than its counterpart manifold M, and the entire system is augmented by a second controller, to wit, the primary or master controller PC.

In other words, the controller SC includes process variable pressure bellows 21, set point pressure bellows 23, and feedback pressure bellows 20 and 22, which bellows coact to actuate baffle and nozzle mechanism represented by nozzle 34, and booster relay 30, said nozzle (via an orifice 33) and said relay being supplied with pressure from a supply port S. Variations in the pressure in bellows 21 cause variations in nozzle back pressure, which are in turn reflected by variations in output pressure of relay 31. By virtue of restrictions 35, which connect bellows 20 and 22 to the output of relay 31, bellows 20 and 22 modify the action of bellows 21, the net result being that changes in process variable pressure result in pressure changes at port 4 corresponding to the magnitude, rate and duration of the changes in process variable pressure. Cut-off relay 31, controlled by the pressure in port 3, is provided in the feedback connection between the output of relay 30, on the one hand, and the restrictions 35 and port 4, on the other hand, in order to provide, on occasion, for disconnecting controller output from port 4 while leaving the feedback bellows 20 and 22 connected to port 4.

The foregoing description covers certain structural characteristics peculiar to a specific controller. However, the specific controller is old in the art, insofar as is concerned this application, and is only one of a number of prior art controllers, different structurally, but functionally alike (from the point of view of ports 1, 2, 3, 4 and S), that might be utilized in our novel cascade circuit.

Controller PC includes process variable pressure bellows 121, set point pressure bellows 123, follow-up and reset bellows 120 and 122, rate and reset restrictions 135, booster relay 130, nozzle 134 fed by orifice 133 from a source of supply pressure (indicated by the small, circled S) which source of supply also supplies booster relay 130. As suggested by the use of parallel series of reference numerals, the enumerated elements of controller PC correspond to similar elements of controller SC. Controller PC, however, does not include a cut-off relay corresponding to cut-off relay 31 of controller SC.

Manifold MC has ports 2, 3, 4 and S connecting controller SC and switch A as the controller C and switch A are connected in FIGURE 1 of the aforesaid prior copending application. Manifold MC has also a port 1 connected to gage 13 (the connection being indicated by a small, circled 1 at gage 13 to avoid a confusion of crossing connecting lines).

By way of example, we envisage our invention as being applied to a process wherein some process variable such as liquid level, temperature, or the like, depends on transfer of fluid to or from the process. Hence, at the corner of FIGURES 1A through 1F is shown a valve CV connected by a flow line L to a box labeled Process, and a measuring transmitter TS, connected to said flow line for the purposes of measuring the flow therein and transmitting the resultant measurement, in the form of a pressure, to port 1, (indicated by repeating the symbol for port 1 near the transmitter TS, so as to avoid the need to cross other lines in the diagrams in drawing the connection of transmitter to port). Likewise, valve is shown to be connected (along with gauge G) to port 4.

As thus far described, the system, including process and control elements therefor, is analogous to a conventional one-variable system, except for the presence of controller PC and the fact that the output of set point transmitter T is not directly connected to port 2, but to a switch B intervening between set point transmitter T and port 2.

As for controller PC, its set point pressure bellows 123 connects to manifold port 9, its process pressure bellows 121 connects to port 6, its follow-up and reset bellows 120 and 122 connect via restrictions 135 to port 8, and its booster relay 130 has its output connected to port 7. Switch B, as shown, has a connection to port 7, a connection to port 2 (as indicated by the symbol for port 2, repeated adjacent port 8), and a connection to port 9 and the output of set point transmitter T in common. Port 7 is also connected to gage 11, and port 6 is connected to gage 12 (as indicated by the repeated symbol for port 6 at the gage 12). Like port 1, also port 6 has an external connection to a process variable transmitter. In the case of port 6, as shown, it has an external connection to transmitter TP which, in turn, is connected to the process to measure a process variable therein and to transmit such measurement in the form of a pressure, to port 6.

The actuating rod 126 of switch B has the seals 127, 128 and 150 thereon, this latter seal being double as explained with reference to FIGURE 5 of the aforesaid prior copending application, in order that as the seal 150 passes the connection of switch B to port 2, no air will blow past the seal 150.

As FIGURE 1A indicates, in the position of rod 126 shown (cascade position), port 7 communicates with port 2, port 2 otherwise dead-ending in switch A between seal 17 and the lower end of casing 25 of switch A, since the set point transmitter output is cut off from port 2 between seals 127 and 150 of switch B.

On the other hand, the rod 26 of switch A is shown in automatic position, i.e., cut-off relay 31 is vented via the vent V of switch A, whereby the effect of the process variable pressure in port 1 on the controller SC is modified by feedback from booster relay 30 via restrictions 35 to bellows 20 and 22. Also, while set point transmitter T does not at this time provide a set point pressure for controller SC, it does for controller PC, the output of set point transmitter T being connected to port 9 and hence to the set point bellows 123 of controller PC.

As is indicated in FIGURE 1A, this state or configuration of the circuit may be termed auto-cascade, since while switch A is in its automatic position to permit controller SC to control the valve automatically, the switch B is set in its cascade position to modify the effect of the "auto" position of switch A to the extent of diverting set point transmitter pressure to controller PC and connecting the output pressure of controller PC to the set point bellows of controller SC. It will be noted that in controller PC, the output of booster relay 130 is not fed back to bellows 120 and 122 within the controller, but, as indicated by the circled numeral 2 at port 8 of manifold MC, port 8 communicates with set point port 2, which permits feedback from booster relay 130 via switch B to bellows 120 and 122. Hence, only when controller PC is in cascade, i.e., providing the bellows 23 of controller SC with output pressure from booster relay 130, is the feedback loop of controller PC connected to its own output.

Those skilled in the art will recognize the foregoing as a typical cascade system insofar as the overall result is concerned, albeit we believe the illustrated combination of elements affording such result to be novel and inventive. In short, primary and secondary process variable pressures, derived by transmitters TP and TS, respectively, from the line L and the process connected thereto, jointly effect operation of the valve in line L and, hence dictate the course of the process—a typical cascade control result.

One of the main virtues of our novel control system is its economy of parts, namely, only one set point transmitter is needed for two controllers. In the prior art, insofar as we are aware, cascade control circuits invariably include as many set point transmitters or equivalents as there are controllers.

Such economy of parts is even further extended, if instrument design practices and the results thereof are considered. The usual prior art controller-recorder instrument is designed as an integrated package, to wit, what amounts to gages G and 13, a set point transmitter and set point indicating means, recording mechanism perhaps, a switch A and a suitable manifold are done up in one housing, to which may be affixed a controller, if that type of controller mounting be desirable. As pointed out in the aforesaid prior copending application of Jaquith et al., the design of such packages is oriented to compactness in panel installations as well as functional flexibility. However, of itself, each instrument package permits only a single-variable process control, although provision may be made for including a cascade switch B or equivalent in the package without increasing panel space requirement or materially affecting the instrument housing, or the layout of components therein. Obviously, however, to provide for cascade control requires two prior art single-controller packages, substantially identical in component complement, except that one package includes a cascade switch. Thus, panel space requirements for a conventional cascade control system are as many times greater than the requirements for a single-variable control system as there are controllers in the cascade.

However, in the aforesaid prior copending application, there is disclosed and claimed a controller-recorder package that is capable of including up to four gages (see FIGURE 3 of the earlier application), a set point transmitter, set point indicating means, a switch A and a switch B, and so on, in practically the same space as required by its prior art counterparts having a lesser number of gages. As it happens, a cascade system requires only four gages plus set point indication. Hence by devising an arrangement whereby one set point transmitter and one set point indicating means can serve two controllers, as a mere matter of weight and bulk, our invention cuts in half the requirements of a cascade control system. Namely, we have eliminated practically all of one of the two instruments the prior art requires for a cascade control. In essence, we retain only two gages and the controller from the eliminated instrument, and, of these, the extra controller does not require panel space (one or both of the two controllers PC and SC of FIGURE 1 may be mounted remote from the rest of the system), and the two gages can be incorporated in the remaining instrument. Also, controllers PC and SC can both be mounted on the back of the panel, either on or near the casing housing the remaining panel-mounted components of our novel control system. In any event, whether the controllers are remote or back-of-panel mounted, panel frontal area is required only for a single instrument casing.

Figure 2:
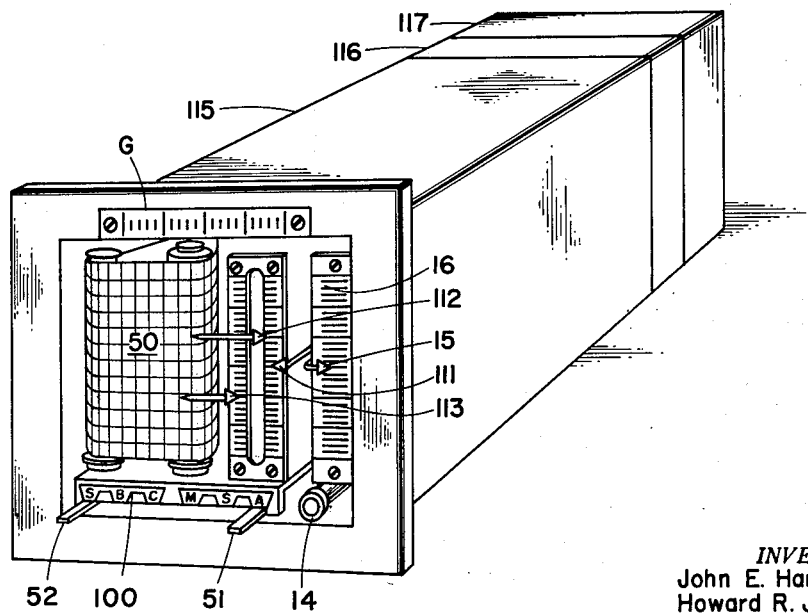
FIGURE 2 shows how certain elements of our novel cascade control circuit can be incorporated in a modern, strip-chart-recording control instrument.

FIGURE 2, which is substantially identical to FIGURE 3 of the aforesaid prior copending application of H. R. Jaquith et al., illustrates a packaged form of our cascade control system (less one of the two controllers PC and SC) shown in the other figures of drawing in the present application. As is obvious from what has been said above, the contents of casing 115 would be the same insofar as bulk and number were concerned, regardless of whether the control system of this application, less one controller, or the control system of FIGURE 1 of the said prior copending application, were accommodated therein.

In fact, the only differences whatsoever would be the connections between the elements making up the system, and in the switch-position tab or other labeling means for switch B, i.e., where the symbols O and P were provided for the operating lever 52 of switch B, as used in the aforesaid prior copending application; in the present case, a tab 100 is provided having the indicia S, B and C, standing respectively for set, balance and cascade. Housing 116 of the present application, of course, will shroud a cascade-type manifold MC at the back of casing 115. Controller housing 117 may house or mount either the controller SC or the controller PC, as desired, necessary or convenient.

Naturally, our novel cascade system, if packaged as in FIGURE 2, will partake of the same expedients of plug-in construction, removability of components, and so on, that go with the package shown in FIGURE 3 of the aforesaid prior copending application.

In terms of uniformity, interchangeability of most system elements with those of a single-variable control system, and the like, it is obvious that our novel cascade control system is extremely advantageous. This excellence is due for the most part to the fact that our system utilizes only one set point transmitter for two controllers, and that the cascade switch (i.e., switch B) serves as the auto-manual switch of one of the two controllers utilized by our system. The resultant system simplicity and reduction in number of system elements is so improved, relative to prior art cascade systems, as to provide enough space in a one-casing instrument to accommodate sufficient indicating devices for operation of a cascade system. Prior art cascade systems, as have been pointed out, allow no such compactness of structure to be retained, since they involve duplication of the parts of a single-variable control instrument in order to make up the cascade system, and therefore nothing less than substantially two casings or equivalent panel space suffices to accommodate the essentials of prior art cascade instrumentation.

While the packaging aspect of the system described herein does not of itself directly affect functional cooperation among the elements thereof, it is of considerable advantage from the point of view of manipulation and supervision of the process. In the prior art cascade systems having separate recorder-controllers, it often is the case that the several recorder and switch assemblies will be located sufficiently remote, one from the other, that one person cannot operate on both struments simultaneously. A frequent and undesirable result of this situation is that in order to avoid walking back and forth between the said assemblies, normally a requisite if the cascade system is operated according to the recommendations of the instrument manufacturer, user-personnel will improvise their own procedures for operating the system instead of the recommended procedures.

However, with a system according to the present invention arranged in a one-package system, the operator is encouraged to follow recommended procedures since all the switches and gages needed in operating the system are at one station from which the operator need not move until he has done whatever is necessary to relate the control instruments to the process in the desired manner.

Moreover, as will be evident from the following, the recommended procedure for using our novel cascade control circuitry is quite simple and not conducive to undesirable variations improvised by the operator.

Beginning with a given process in an inactive state and a final control element, say the control valve shown in FIGURES 1A through 1F, which if opened will start the process up and affect two variables obtaining in the process in some fashion related to the extent of valve opening as well as other influences on the process, the motor of said valve will be connected to port 4 of manifold MC. Also, the measuring pressure transmitter TS, the pressure output of which is proportional to one of said variables, will be connected to port 1, so as to actuate bellows 21 of the slave controller SC, and the second measuring pressure transmitter TP having a pressure output proportional to the other said variables will be connected to port 6, so as to actuate bellows 121 of the master controller PC.

At the same time switch A will be in seal position, i.e., with seals 18 and 19 straddling the connections of ports S and 3 to the said switch and with seal 17 between the connections of ports 2 and 4 with switch A. Switch B will be in the set position, i.e., with seals 127 and 150 straddling the connections of port 2 to switch B and the connection of the set point transmitter to switch B. Likewise, an external supply of operating pressure, say air at about 20 p.s.i., preferably filtered and dried, will be connected to port S, and as indicated by the circled letters S juxtaposed thereto, to set point transmitter T and to booster relay 130, manifold MC including supply connections (not shown) for transmitter T and relay 130.

This position may be termed "seal/set" and is shown in FIGURE 1B. Thus, as is readily apparent from FIGURE 1B, ports 2 and 4 are isolated from each other, supply pressure is admitted to cut-off relay 31 of controller SC, whereby the connection of port 4 to switch A is cut off from the other connections to the switch, so that the process valve and bellows 20 and 22 are cut off from all else in the circuit. On the other hand, it is evident that switch B interconnects ports 2 and 9 and the set point bellows of both controllers with the output of set point transmitter T.

At this point gages 12 and 13 will indicate, respectively, the value of the master variable and the value of the slave variable, and knob 14 of set point transmitter T is turned until the set point pressure output thereof as indicated by the position of pointer 15 on scale 16, is at a value suitable for opening the valve to some desired extent suitable for bringing the process to life.

Switch A is now set in manual position, i.e., seal 17 above its connection to port 4 and its connection via port 2 to switch B, and seals 18 and 19 still straddling the connections of ports 3 and S to the switch, whereby set point transmitter output passes through switches A and B into port 4, and positions the control valve. This state of the circuit may be termed manual/set and its essence is shown in FIGURE 1C, and, at this point, knob 14 is manipulated until gage 12 indicates that the master variable is at the desired value.

When the master variable reaches the desired value, switch A is returned to seal (that position of switch A shown in FIGURE 1B seal/set), and knob 14 is manipulated to adjust the set point transmitter output to a value corresponding to the indication of gage 13, upon which switch A is set in automatic position, the position of switch A illustrated in FIGURE 1A, switch B, however, remaining in its set position (that position of switch B shown in FIGURE 1B). As a result, the circuit is in the auto/set state shown in FIGURE 1D.

The slave variable, i.e., that represented by the pressure in port 1 would ordinarily be the flow throught the said valve. Hence, the process is now being controlled by controller SC alone with the valve open enough to maintain the master or primary variable, i.e., that represented by the pressure in port 6, at the desired value, and a set point for controller SC has been established such that if the flow through the valve varies, controller SC will counteract the effect of such variation by increasing or decreasing valve opening.

It is now necessary to establish a set point for controller SC that reflects deviations in the master variable, and a set point for controller PC that reflects the desired value of the master variable. This entails switching the output of transmitter T on to the set point input of controller PC and substituting the output of controller PC for the fixed set point pressure now obtaining in the set point bellows 23 of controller SC. When this is done, the process is under cascade control with the controller SC not only regulating the slave variable so as to oppose any change therein that would cause the master variable to deviate from its desired value, but also at the same time varying the slave variable in response to the output of controller PC so as to counter deviations of the master variable, irrespective of the origin of such deviations.

In the set position of switch B, not only is controller PC isolated from controller SC and from the process (insofar as affecting the process is concerned), but also there is no feedback from booster relay 130 to follow-up and reset bellows 120 and 122. Hence, if the baffle and nozzle mechanism of controller PC, including nozzle 134, is arranged to have a high gain in the absence of feedback, relative to pressure differential between bellows 121 and 123 of controller PC, the process control point detection described in the aforesaid prior copending application of H. R. Jaquith et al. can be utilized in adjusting controller PC so that its output can be substituted for the set point pressure transmitter output in bellows 23 of conroller SC.

In order to prepare controller PC for the substitution, the rod 126 of switch B is moved just enough to occlude its connection to port 2 with double seal 150 (an inherent characteristic of switch B as will be seen from the description of FIGURE 5 of the aforesaid prior copending application of H. R. Jaquith et al.).

This position of switch B may be termed balance position and, in it, it will be seen that seals 127 and 150 dead-end set point transmitter output in switch B and, hence, isolate set point pressure from controller SC, while seals 128 and 150 isolate the connection of port 7 via switch B from port 2. The connection between ports 2 and 8, however, is independent of switch B, hence the pressure output of set point transmitter T remains effective on set point bellows 123 of controller PC. On the other hand, set point pressure bellows 23 of controller SC is sealed off with a pressure therein substantially the same as the pressure output of transmitter T existing when switch B was set to balance position. The circuit is now in an auto/balance state shown in FIGURE 1E, i.e., controller SC is still controlling the process; but the set point pressure transmitter T is now free for use in connection with controller PC, independently of controller SC.

Therefore, the afore-mentioned control point detection procedure can be utilized to adjust controller PC so that the output of booster relay 130 corresponds to the value of the master variable as represented by the pressure in bellows 121. Thus, with switch A in automatic position and switch B in the balance position, set point transmitter knob 14 is manipulated until a set point pressure is established that balances the pressure in bellows 121, as indicated by gage 11 connected to port 7 behaving as described in the case of gage G in the aforesaid prior copending application of H. R. Jaquith et al., wherein the latter gage is used as a controller output gage, rather than as a valve gage.

Since no by-pass switch as described in the afore-mentioned prior copending application is provided for controller PC, one must observe the precautions described in the aforesaid copending application in order to obviate any unbalance effect due to bellows 120 and 122 during control point detection procedure.

Set point transmitter T now having been set to produce the proper set point pressure, switch B is set to the cascade position, i.e., the position of switch B illustrated in FIGURE 1A, wherein the output pressure of controller PC is transmitted from port 7 via switch B between seals 128 and 150 to port 2 and the set point bellows 23 of controller SC, set point transmitter T provides the set point pressure for controller PC, and controller SC provides output pressure for operating the process control valve connected to port 4 of manifold MC, switch A remaining in its auto/position, whereby the circuit configuration has reverted to the auto/cascade position illustrated in FIGURE 1A.

Obviously, if controller PC was of a type not permitting control point detection, it could instead be prepared for switching from balance to cascade, by adjusting the knob 14 of transmitter T (with switch B in balance position) until pointer 15 indicates on scale 16 the set point pressure corresponding to the reading of the master variable on gage 12.

In any event, the general procedure described above to be followed in starting up the process and putting it on cascade control is so straightforward and facile as not to tempt the operator to deviate from the said procedure. This is in great part due to the fact that only one set point transmitter is provided and that switch B doubles as a sort of auto-manual switch for controller PC. Hence, there are relatively few adjusting devices to fiddle with or to be confused by the operator, namely, only one set point knob and two switch levers, as compared to a conventional cascade system wherein there are provided several set point transmitters each having a knob or other adjusting means and several auto-manual switches, in addition to a cascade-set switch.

To revert back to automatic control by the slave controller SC alone, it is merely necessary to return the switch B to balance position and adjust the knob 14 of set point pressure transmitter T until pointer 15 indicates that the output of the set point transmiter corresponds to the value of the slave variable as indicated by gage 13. The switch B can then be set to set position, whereupon the slave controller SC now controls valve position according to the relation between a fixed set point pressure valve and the pressure in port 1. In other words, the circuit is now in an auto/set position which corresponds to the auto-balance condition shown in FIGURE 1E, except that since set point transmitter T is, for the time being, not needed by controller PC, it may be used to supply set point pressure to controller SC.

The circuit shown in FIGURE 1 also has the advantage that the final control element can also be controlled by the master controller PC alone. For example, beginning with switch A in manual position and switch B in set position, (i.e., the circuit is put in the manual/set state shown in FIGURE 1C), the final control element can be positioned by use of set point transmitter T as described before so that the master variable is at the desired value. Then, instead of passing through seal to automatic position of switch A and through balance to cascade position of switch B, switch A is set to seal position, switch B is set to balance position and the output of set point transmitter T is adjusted until it corresponds to the reading of gage 12, or until gage 11 indicates detection of the control point of controller PC, whereupon switch B may then be set to cascade position, and, after this, switch A may be set to manual position. The result of this switching scheme results in the circuit state shown in FIGURE 1F, which state may be termed manual/cascade.

As is apparent from FIGURE 1F, in the manual/cascade state, the output of controller SC is cut off by cut-off relay 31, the effect of the output of set point transmitter T is confined to bellows 123 of controller PC, and the output of controller PC passes into port 2 of the manifold and into the space below seal 17 of switch A and thence to port 4 (since, in manual position of switch A, seal 17 is between the switch connections to ports 3 and 4), the feedback in the circuit of controller PC, of course, going from port 2 to port 8, and thence to bellows 120 and 122.

In executing the foregoing switching procedure, if controller PC does not permit control point detection, the output pressure of controller PC can be adjusted with switch B set in either set position or in balance position, before changing the setting of switch A from seal to manual.

The advantages of being able to control the process according to the dictates of the primary variable in the manner of a single variable control system may be summed up by saying that it is an emergency measure useful in the case of malfunction of the secondary controller, and that the user often desires it, even though his object in installing a cascade control system is to circumvent difficulties encountered in attempting to control the process involved without introducing a secondary variable as a factor influencing control of the process.

FIGURE 3 shows a modification of the basic circuit of FIGURES 1A through 1F that may be used where it is more important to be able to switch to manual control of the process with the greatest facility than to be able to automatically control the process by controller PC alone. All that the modification amounts to is to connect switch A to the output pressure of transmitter T, rather than to port 2. In terms of FIGURES 1A through 1F, connection X of switch A, between switch A and port 2, is replaced by a connection X', FIGURE 3, between switch A and transmitter T. Hence, transmitter T can communicate with port 2 only via switch B.

The circuit of FIGURE 3 is utilized in the same manner as the circuits of FIGURE 1A et al., except that it cannot be put into the manual/cascade state of FIGURE 1F for control by controller PC alone. On the other hand, this decreased versatility is accompanied by a greater facility in reverting to manual control by controller SC. For this reason, the circuit of FIGURE 3 may sometimes be preferred to that of FIGURES 1A through 1F from the point of view of the operator, for the reason that the first step to be taken in cases of emergency is to take over control of the control valve by means of transmitter T. (For simplicity, neither the control valve, the line L, the process, the transmitters TS AND TP, nor the legendry of FIGURES 1A through 1F, are shown in FIGURE 3. The species of FIGURE 3, of course, does not differ from the species of FIGURES 1A through 1F, in these respects.)

As will be seen from FIGURE 3, the circuit is in the auto/cascade state, i.e., as in FIGURE 1A, controller SC is operating the valve in cascade with controller PC, but if switch A is flipped to its manual position, cut-off relay 31 acts to isolate the output of booster relay 30 from port 4 and at the same time port 4 is connected to transmitter T. The circuit of FIGURE 3 is now in a manual/cascade state corresponding to the manual/cascade state of FIGURE 1F, except that transmitter T, not controller PC, has its output connected to port 4, and the valve may therefore be controlled by manipulation of knob 14.

With the circuit of FIGURES 1A through 1F the manual control state is manual/set (FIGURE 1C) that is, both switches A and B must be manipulated to revert to manual control. Therefore, with the more flexible version of the circuit, namely, that of FIGURES 1A through 1F, there is more chance of the operator becoming confused and doing the wrong thing, or not doing the right thing, if he has to operate two switch levers, instead of one, to take over control of the valve from one or the other or both controllers.

Nevertheless, in both the circuits of FIGURES 1A through 1F and the circuit of FIGURE 3 the usual essentials of a cascade system are attained according to our invention with the same economy of parts. Whatever modifications of our novel system be adopted, it is obviously essential that the switching means (e.g., switches A and B) permit isolation of the master controller while the slave controller remains operable as a conventional auto-manual single-variable controller, and that the switching means also permit the output of the former controller to act as the set point of the latter conroller, when desired, and at the same time permit the same set point adjusting means (such as set point transmitter T) to be utilized for both controllers.

Furthermore, one of the main objections of instrument users to cascade instrumentation has been that proper manipulation of the controllers of prior art cascade type of system in adjusting such system to the process is often a confusing mystery, as well as an inconvenience, to the operating personnel entrusted with the task of manipulating the system. The reason for this is that such personnel are likely to be used to the relatively straightforward manipulation of a single-variable control system from a single control station including set point adjustment means, and auto-manual switch, and the appropriate exhibited devices, and although the said personnel may not understand in detail what is the effect of its manipulations, there is a reasonableness to the simple scheme of manipulations used that prevents any confusion on the part of the operator.

However, with a cascade system of the prior art type, when the operator is instructed to cause the slave controller to establish a value of a master variable and not the value of the slave variable, and so on, his expectations, derived from his experience with single-variable instruments may be confounded, for the natural thing to him is to get the valve to a position such as to obtain a desired value of the variable directly affected by the valve (which variable is here the slave or secondary variable), and not of some other variable which is associated with some other instrument, the control station of which and/or the controller of which (i.e., the master controller) is remotely located, and only remotely related (in the operator's mind) to the slave instrument and control station. Obviously, therefore, operator-troubles easily arise when the operator is faced with two auto-manual switches, a cascade switch, a pair of set point adjustments and a half dozen or so gages or the like, often inconveniently located, all of which he has to adjust by a procedure much more complicated, and having much less apparent reasonability, than the old single-variable procedure.

For example, starting up a process and getting it on cascade with a two-instrument prior art system involves four distinct operating phases, each having its own sequence of manipulations. Thus, in the first phase, the process is gotten under way on automatic control by the secondary controller alone. In the second phase, the master instrument must be lined up in manual use, more or less, as a manually-adjusted substitute for the set point transmitter of the slave instrument. In the third phase, the output of the slave set point transmitter is replaced by the control output of the master instrument operated in manual. In the fourth phase, the master instrument is manipulated by means of its set point adjustment and auto-manual switch in order to adjust it from manual to automatic action in a manner analogous to that in which the slave instrument was operated in the said first phase. The awkwardness of this scheme is self-evident, and obviously is compounded if the control stations for the two instruments are separated by any considerable distance.

With our improved system, however, there are no control station separation problems, and the manipulation procedure is simplified, and possibility of confusion is reduced because of the reduction in duplication of components such as auto-manual switches, etc. This is true for both the basic circuit of FIGURES 1A through 1F and the circuit of FIGURE 3.

Another advantage is in the convenience of having both variables recorded on one chart, so as to facilitate study of the behavior of the process especially where comparison of one variable with another is necessary. For example, the need to adjust one of the controllers (as to reset, rate or gain response, that is) can be quickly and easily ascertained by comparing the recorded periods of stylus excursions in response to process disturbances. Obviously, comparing traces in separate charts requires much more care and time, than if the traces are on the same chart. As FIGURE 2 shows, a pair of pointer-styli 112 and 113 are provided that move up or down to mark a chart 50 accordingly. The pointer-styli 112 and 113 are actuated by gages 12 and 13 respectively, whereby both primary and secondary variables are recorded on chart 50. (Pointer 111 in FIGURE 2 is operated by gage 11.)

It is clear from the foregoing that the novel system of FIGURE 1 is immensely superior to prior art systems in terms of cost and utility in all their ramifications such as initial investment, maintenance and overhead, operator-convenience, efficiency of use, and so on. The importance of our innovations is indicated by the fact that commercial experience with our novel control system is that prospective users of control systems, once reluctant (because of cost and the above-described operational drawbacks) to introduce cascade control where it was needed, are easily persuaded to install our novel system.

Other types of controllers than that illustrated could be utilized in the system of FIGURE 1. For example, the controller shown in FIGURE 8 of U.S. Letters Patent No. 2,638,919 to R. E. Clarridge, dated May 19, 1953, entitled "Apparatus For Controlling A Process" and assigned to the assignee of the present application, could also be used. In such case, using the Clarridge controller SC as secondary controller, set point chamber 89 would be connected to port 2 of manifold MC, instead of directly to a set point regulator V, and chamber 88 would receive process variable pressure from manifold port 1, and the common portion of pipes 73 and 74 would be connected to port 4. Also, a cut-off relay would be added in the pipe 73 to cut-off feedback of booster relay output to the second stage relay to be actuated by pressure from port 3, just as cut-off relay 31 is utilized in the circuitry disclosed by the present application.

Using the Clarridge controller as primary controller PC, pipe 73 would be connected to port 7, pipe 74 to port 8, chamber 88 to port 6, and chamber 89 to port 9. As in the case of controller PC, no cut-off relay would be used. Note that the multiple-stage principle of the Clarridge controller does not permit control point detection when used as a primary controller. In spite of this and other differences, both in structure and mode of operation within the controller circuit, the Clarridge controller, if connected as indicated supra, will otherwise perform in the same style as the Jaquith controller, with regard to switching and adjustment as described in the present application.

FIGURES 1, 4 and 7 of the Clarridge patent illustrate still other types of controller susceptible to similar treatment, save to note that with these controllers no particular means for adjusting set pointer 17 is represented in the patent, and a bellows or like pressure-operated motor would be required in addition to the structure shown in the patent in order to provide a convenient mode of utilizing a set point pressure transmitter T, as disclosed in this application, to set in the control points for master and slave.

In the foregoing we have described switching procedures in detail. In practice, variations of the described procedures will be encountered. For example, we have described process start-up as beginning with switch A in seal, while the set pointer knob is operated to establish some desired valve-operating pressure, which is then turned on to the valve by adjusting switch A to manual position. However, some users will prefer to have switch A in manual position from the very beginning. Likewise, switch A may be left in manual position at all times during the switching procedure described above for switching the master controller PC into sole control of the final control element alone.

However, we are not directly concerned here with details of switching procedures, but with circuit arrangements some advantages of which are to simplify and facilitate whatever switching procedure is used and to simplify the basic structural make-up of cascade circuitry.

The essential operational characteristics of the type of control system described herein are to permit valve control by the set point transmitter output alone, by at least one of the controllers alone, or by both controllers in cascade. Relative to prior developments along these lines, our novel circuitry is a decided improvement in terms of the factors of simplicity, facility and economy. Insofar as we are aware, it has not been heretofore possible to improve the said factors without detriment in terms of said operational characteristics. For example, it is relatively easy to make do with one set point transmitter provided operations are to be limited to manual and cascade only.

Finally, we believe that we are the first to provide a circuit which features control by either controller alone, without resort to all the essentials of what we have described above as a prior art two-instrument system.

In accordance with the statutes, the foregoing represents a full, clear and concise disclosure of our invention in the most useful form thereof thus far conceived by us. However, it will be clear to those skilled in the art that a cassade control system according to the present invention may be made up of elements specifically and individually different from those shown and described herein. Hence, the scope of our invention is to be determined with reference to the following claims, rather than by disclosed details of structure.

While we have described our invention as being composed of pneumatically-operated components, those skilled in the art will be familiar with functionally-equivalent components of hydraulic or electrical nature which can be combined in the light of our teachings and without invention to form all or part of as cascade control system or instrument functionally equivalent to the pneumatic system we have described supra. Hence, in the claims infra we have generally avoided referring to pressure or pressure-operated mechanism, using instead the term "signal," and so on, in order to avoid limiting the scope of our invention exclusively to air-operated systems.

We claim:

1. A master-slave controller system including a set point transmitter adjustable to provide a set point signal; a slave controller having a control signal output, a set point signal input and a slave process variable input; a master controller having a setting signal output, a set point signal input and a master process variable input; switching means operable to any one of several states, a first of said states being one in which said set point signal input of said slave controller is connected to said transmitter to receive said set point signal; a second of said states being one in which said set point input of said slave controller is connected to said setting signal output of said master controller and said set point input of said master controller is connected to said transmitter to receive said set point signal; and each of said controllers being of the type wherein its signal output is a function of the relation between signals applied to its inputs.

2. The invention of claim 1 wherein said switching means is also operable to a third state in which said set point transmitter is connected to said set point signal input of said master controller, but not to the set point signal input of said slave controller, and said setting signal is not applied to said set signal input of said slave controller, whereby before the said switching means is operated to its said second state said set point signal may be adjusted to suit the said master process variable without affecting the control signal at the control signal output of said slave controller.

3. The invention of claim 1 wherein the said master controller includes a high gain detecting device responsive to deviation from equivalence of respective signals applied to the inputs of said master controller to produce a change in the setting signal of said master controller, said master controller also including a feedback means connected to said setting signal output for applying said setting signal to said detecting device so as to modify the gain of said detecting device; and said switching means is also operable to a third state in which said set point transmitter is connected to said set point signal input of said master controller, but not to the set point signal input of said slave controller, said feedback means is rendered inoperative to apply setting signal to said detecting device, and said setting signal is not applied to said set point signal input of said slave controller, whereby if said switching means is operated from the said one of said states to the said third state, in the said third state the said set point signal can be matched to a master process variable signal applied to said master process variable input of said master controller by adjusting said set point transmitter until said detecting device responds by producing a large change in setting signal, whereupon the said switching means can be operated to said second state and said setting signal will be applied to said set point signal input of said slave controller at a level corresponding to the value of said master process variable.

4. In combination, a final element responsive to the level of a control signal applied thereto to change the magnitude of at least two process variables in a process; a slave controller for applying said control signal to said final element, said controller being responsive to a first of said process variables and to a reference signal to vary said control signal as a function of the relation between said reference signal and said first variable; a device adjustable to produce said reference signal at different desired levels; a master controller corresponding to said slave controller as the latter has been described thus far, but responsive to a second of said process variables rather than to said first process variable; transfer means for alternately applying said reference signal to said slave controller, or said reference signal to said master controller, said transfer means including means for applying the control signal output of said master controller to said slave controller in place of said reference signal when the latter is applied to said master controller.

5. The invention of claim 4 wherein said transfer means is also operable, simultaneously, to apply said reference signal to said master controller, and to prevent said reference signal and said control signal of said master controller from being applied to said slave controller, whereby if said transfer means is operated as last aforesaid, said device may be adjusted until said reference signal and one of said process variables are in said given relationship.

6. The invention of claim 4, including indicating means responsive to the control signal output of said master controller, and wherein said master controller is of the type having detecting means that is inherently highly sensitive to relatively small deviations of said reference signal and said second process variable from a given relationship to each other and, hence, would cause said controller to produce relatively large changes in its control signal output, said master controller including means for feeding its control signal output back to said detecting means so as to modify the sensitivtiy of response of its detecting means; said transfer means being operable, simultaneously, to apply said reference signal to said master controller, to temporarily prevent said control signal of said master controller from being fed back to said detecting means, and to prevent said reference signal and said control signal of said master controller from being applied to said slave controller, whereby if said transfer means is operated as last aforesaid, said device may be adjusted until said reference signal and said second process variable are in said given relationship, as evidenced by the indications of said indicating means.

7. A one-case cascade control instrument comprising in combination: master variable exhibiting means, slave variable exhibiting means, master control signal exhibiting means, set point signal indicating means, set point adjusting means having an adjustable set point signal output, manual-automatic transfer means for causing a slave controller to operate a final control element in accordance with the relation between said set point signal output and a slave variable in a process under control of said final control element, or, simultaneously, to prevent said controller from operating said control element and to connect said set point signal to said final control element for operation of the latter by the former; cascade transfer means operable either to connect said set point signal to said slave controller or, simultaneously, to connect said set point signal to said master controller and to connect said master controller to said slave controller for operation of the latter in response to the relation between said slave variable and a control output signal of said master controller, said master controller being responsive to the relation between said master variable and said set point signal to produce a control signal output; means exhibiting the control signal effective on said final control element; all of the aforesaid means being included in a single support structure; said support structure including means for interconnecting said exhibiting means with the necessary sources of variables and signals to be exhibited thereby, means for connecting a slave controller to said manual-automatic transfer means and to said set point adjusting means so as to permit exercise of the transfer function of said manual-automatic transfer means, and means for connecting said cascade transfer means to said slave controller and to said master controller to permit exercise of the transfer functions of said cascade transfer means.

8. The invention of claim 7 wherein said cascade transfer means is also operable to a state in which said set point transmitter is disconnected from said slave controller, whereby said set point adjusting means can be adjusted to provide a suitable value of set point signal for said master controller without such adjustment affecting the said final control element and before applying the control signal output of said master controller to said slave controller in place of set point signal.

9. A master-slave controller system including a master controller having a set point signal input and control signal output and a slave controller having a set point signal input and a control signal output; a set point transmitter having a set point signal output; first switch means connected to said transmitter and to said slave controller, and operable to connect said set point signal output to the said set point signal input of said slave controller or to a final control element and to the said set point signal input of said slave controller; second switch means connected to said control signal output of said master controller and operable to block the connection of said set point signal output to said first switch means, and also operable while the said connection is thus blocked to connect said control signal output of said master controller to said set point signal input of said slave controller, said set point signal output also being connected to the said set point input of said master controller when the connection of said set point signal output to said set point input of said slave controller is blocked; said first switching means being further operable to connect said final control element and said control signal output of said slave controller with said set point signal output connected to said set point input of said slave controller but not connected to said final control element; whereby either the slave controller or master controller may have its control signal output connected to said final control element, and, when said control signal output of said slave controller is connected to said final control element, either the said control signal output of said master controller or the said set point signal output may be connected to the set point signal input of said slave controller.

10. In combination with a first controller having a set point signal input and a control signal output, a final control element having a control signal input, a set point transmitter having a set point signal output, and first switching means having functions permitting, one, either the said control signal output or, two, said set point signal output to be connected to said control signal input, whereby to permit control of said final control element either by said first controller or by said set point transmitter; a second switching means and a second controller, said second controller having a control signal output and a set point signal input, said second switching means being operable to perform the respective switching functions of, first, to disconnect or connect said set point signal output and said set point signal input of said first controller, or, second, to connect or disconnect said control signal output of said second controller and said set point signal input of said first controller.

11. The invention of claim 10 wherein both of the said switching functions of said second switching means can be of the disconnect type simultaneously to define a third switching function performable by said second switching means, and said first switching means is operable to perform the function of sealing off said set point signal input of said first controller when said third switching function is performed by said second switching means.

12. The invention of claim 10 wherein said second controller is of the type having a feedback connection to its control signal output, said feedback connection being connected to said set point signal input of said first controller, and being normally disconnected from said control signal output of said second controller unless said second switching means has performed the function of connecting the said control signal output of said second controller to said set point signal input of said first controller.

13. A pair of controllers each having a control signal output, a set point signal input, a process variable signal input and a feedback connection acting in effect between its said control signal output and the said inputs, each said controller being of the type wherein a control signal at its said control signal output reflects a relationship between a set point at its said set point signal input and a process variable signal at its said process variable signal input, and wherein a control signal from its said control signal output in its said feedback connection further modifies the said control signal, a further connection between the feedback connection of one of said controllers and the set point signal input of said other of said controllers, the feedback connection of said one of said controllers including said further connection as a necessary part thereof in that unless the said further connection permits, no feedback effects occur in said one of said controllers, and means for disabling said further connection at will whereby the control signal at the control signal output of said other of said controllers may be caused to reflect the relationship between a set point signal and process variable signal output wherein the last said set point signal is an independent signal, if said further connection is disabled, whereas if an independent signal is applied to said set point signal of said one of said controllers, and said further connection is not disabled, the control signal at the said control signal output of the said one of said controllers acts as a set point signal at the said set point signal input of said other of said controllers.

14. The invention of claim 13, wherein said further connection provides whatever signal is at the said set point signal input of said other of said controllers as feedback in said one of said controllers, irrespective of whether said further connection is disabled or not.

15. In pneumatic control apparatus, a fluid pressure responsive member to be controlled; a fluid pressure regulator connected to a source of fluid under pressure and having a controlled fluid pressure output; a first fluid pressure controller responsive to a condition and having a pressure fluid output connection, a control point setting fluid pressure connection connected to said regulator output, and a reset control portion with a fluid connection thereto; a second fluid pressure controller having an input connection for a pressure responsive to a condition, a pressure fluid output connection, and a control point setting fluid pressure connection; and switching means having three positions for determining the pressure applied to said fluid pressure responsive member, one each for the conditions of manual control, control by the second controller and cascade operation, said switching means having portions for manual control for direct connection of said pressure regulator to said fluid pressure responsive member, portions for control by the second controller establishing communication between the output connection of the second controller and the pressure responsive member and between the output connection of the pressure regulator and the control point setting connection of the second controller, and portions for cascade operation establishing communication between the output connection of the second controller and the pressure responsive member and between the output connection of the first controller and the control point setting connection of the second controller.

16. In pneumatic control apparatus, a fluid pressure responsive member to be controlled; a fluid pressure regulator connected to a source of fluid under pressure and having a controlled fluid pressure output; a first fluid pressure controller responsive to a condition and having a pressure fluid output connection, a control point setting fluid pressure connection connected to said regulator output, and a reset control portion with a fluid connection thereto; a second fluid pressure controller having an input connection for a pressure responsive to a condition, a pressure fluid output connection, and a control point setting fluid pressure connection; and switching means having five positions for determining the pressure applied to said fluid pressure responsive member, one each for the conditions of manual control, control by the second controller and cascade operation, and two positions for isolating said fluid pressure responsive member, said switching means having portions for manual control for direct connection of said pressure regulator to said fluid pressure responsive member, portions for control by the second controller establishing communication between the output connection of the second controller and the pressure responsive member and between the output connection of the pressure regulator and the control point setting connection of the second controller, portions for cascade operation establishing communication between the output connection of the second controller and the pressure responsive member and between the output connection of the first controller and the control point setting connection of the second controller, and portions for isolating said fluid pressure responsive member.

References Cited in the file of this patent

UNITED STATES PATENTS 2,969,080     Mamzic _____ Jan. 24, 1961